(12) United States Patent

Grafman

(10) Patent No.: US 12,562,073 B2

(45) Date of Patent: *Feb. 24, 2026

(54) SYSTEM AND METHOD FOR LEARNING TO PLAY A MUSICAL INSTRUMENT

(71) Applicant: Keith Grafman, Lyndhurst, NJ (US)

(72) Inventor: Keith Grafman, Lyndhurst, NJ (US)

( * ) Notice: Subject to any disclaimer, the term of this patent is extended or adjusted under 35 U.S.C. 154(b) by 842 days.

This patent is subject to a terminal disclaimer.

(21) Appl. No.: 16/420,374

(22) Filed: May 23, 2019

(65) Prior Publication Data

US 2023/0024727 A1 Jan. 26, 2023

Related U.S. Application Data

(63) Continuation-in-part of application No. 15/375,951, filed on Dec. 12, 2016, now Pat. No. 10,339,829, which is a continuation of application No. 14/018,490, filed on Sep. 5, 2013, now Pat. No. 9,524,652.

(51) Int. Cl.

| | |
|---|---|
| *G10H 1/34* | (2006.01) |
| *G09B 5/06* | (2006.01) |
| *G09B 15/00* | (2006.01) |
| *G10D 1/08* | (2006.01) |
| *G10D 3/08* | (2020.01) |
| *G10D 3/153* | (2020.01) |
| *G10H 1/00* | (2006.01) |

(52) U.S. Cl.

CPC ............. *G09B 15/00* (2013.01); *G09B 5/065* (2013.01); *G10D 1/085* (2013.01); *G10D 3/08* (2013.01); *G10D 3/153* (2020.02); *G10H*

*1/0008* (2013.01); *G10H 1/342* (2013.01); *G10H 2210/091* (2013.01); *G10H 2220/051* (2013.01); *G10H 2220/061* (2013.01); *G10H 2220/091* (2013.01); *G10H 2220/265* (2013.01); *G10H 2220/455* (2013.01)

(58) Field of Classification Search

CPC ....... G10H 2220/165; G10H 2220/455; G10H 1/342; G10H 2230/135; G10H 2220/005; G10H 2220/051; G10H 2220/301

See application file for complete search history.

(56) References Cited

U.S. PATENT DOCUMENTS

| | | | | | |
|---|---|---|---|---|---|
| 4,658,690 | A | * | 4/1987 | Aitken | ................... G10H 1/342 |
| | | | | | 84/646 |
| 5,065,659 | A | * | 11/1991 | Uchiyama | .............. G10H 1/342 |
| | | | | | 84/723 |
| 5,270,475 | A | * | 12/1993 | Weiss | ................... G10H 1/0016 |
| | | | | | 84/645 |

(Continued)

*Primary Examiner* — Christopher Uhlir

(57) ABSTRACT

A method and system for teaching oneself to learn to play a string instrument and master it by analyzing ones real-time hand/finger movement/technique/form, enabling oneself to progress and correct ones own mistakes simultaneously. In one aspect, a system for learning to play a string instrument is provided that includes a simulation instrument that includes a plurality of strings, wherein at least one of the strings includes at least one-touch sensing sensor thereon in communication with at least one processor to receive a signal from the at least one touch-sensing sensor and determine therefrom when and where on the at least one string a user applies pressure to the at least one string.

20 Claims, 1 Drawing Sheet

(56)                    References Cited

U.S. PATENT DOCUMENTS

| | | | | |
|---|---|---|---|---|
| 5,585,583 | A * | 12/1996 | Owen | G09B 15/00 |
| | | | | 84/454 |
| 6,162,981 | A * | 12/2000 | Newcomer | G09B 15/04 |
| | | | | 84/723 |
| 6,995,310 | B1 * | 2/2006 | Knapp | G09B 5/065 |
| | | | | 84/645 |
| 7,361,829 | B2 * | 4/2008 | Uehara | G10G 1/02 |
| | | | | 84/746 |
| 7,714,220 | B2 * | 5/2010 | Festejo | G09B 15/06 |
| | | | | 84/723 |
| 8,878,042 | B2 * | 11/2014 | Van Wagoner | G10H 1/0016 |
| | | | | 84/293 |
| 9,524,652 | B2 * | 12/2016 | Grafman | G10H 1/0008 |
| 10,339,829 | B2 * | 7/2019 | Grafman | G10H 1/0008 |
| 2010/0137049 | A1 * | 6/2010 | Epstein | A63F 13/44 |
| | | | | 463/7 |
| 2011/0132180 | A1 * | 6/2011 | Gobbers | G10H 1/14 |
| | | | | 84/622 |
| 2015/0059556 | A1 * | 3/2015 | Grafman | G09B 15/002 |
| | | | | 84/485 R |

* cited by examiner

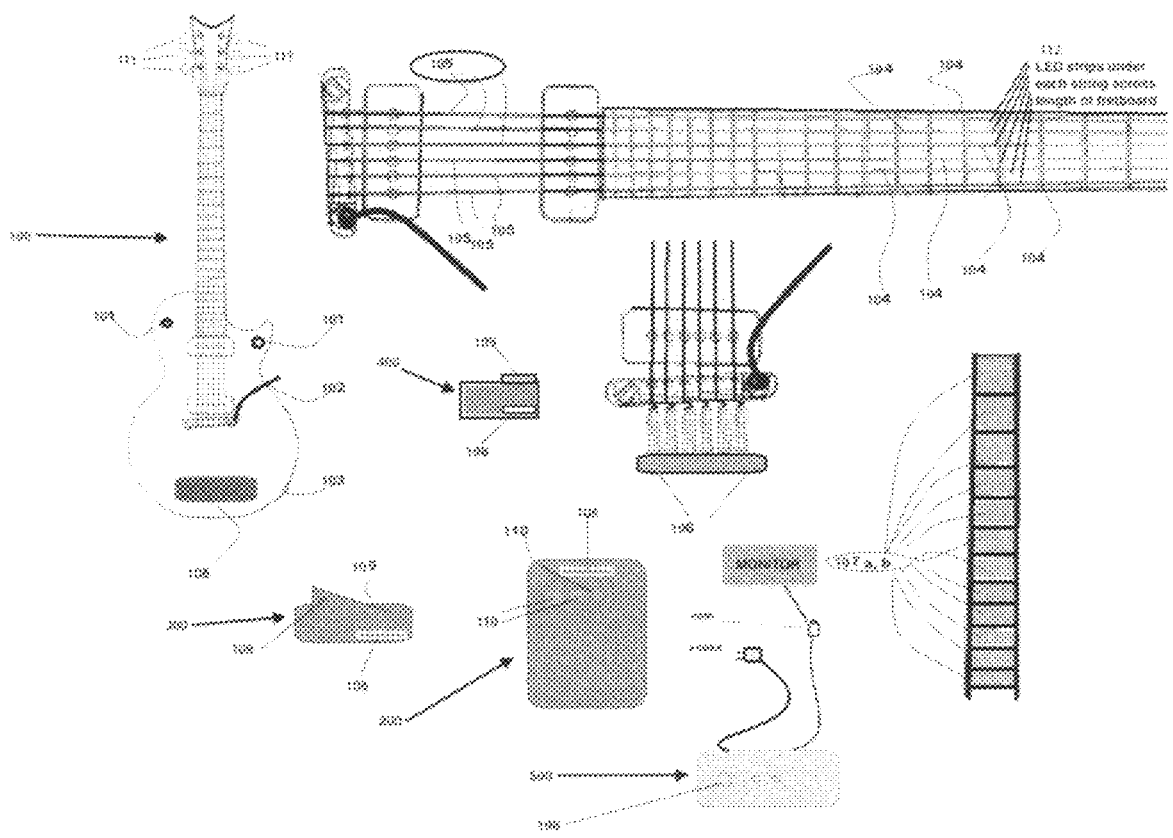

SYSTEM AND METHOD FOR LEARNING TO PLAY A MUSICAL INSTRUMENT

COPYRIGHT NOTICE

FIELD OF THE INVENTION

The invention described herein generally relates to interactive learning of playing musical instruments.

BACKGROUND OF THE INVENTION

Becoming an instrumentalist is an ongoing journey; it requires time, dedication and encouragement through self-accomplishment. Amidst teaching oneself to play instrument, one must find an effective way to know what he/she is doing vs. what he/she needs to be doing simultaneously (analyzing one's real-time hand/finger movement), enabling oneself to progress and correct one's own mistakes simultaneously. This allows one to answer his/her own questions, so he/she can progress at their leisure.

Using a book or learning from an instrument instructor can both be very effective methods; however, a book can't interact with you in 'real-time', and having an instructor can become very expensive as you pay for their time. There is thus a need to enable people to teach themselves at their own pace with real-time technology, while correcting their own mistakes. The present invention provides for a solution that is digital, accurate real-time feedback, with step-by-step and fail-proof instructions.

SUMMARY OF THE INVENTION

The present invention provides a method and system for teaching oneself to learn to play a string instrument and master it by analyzing one's real-time hand/finger movement/technique/form, enabling oneself to progress and correct one's own mistakes simultaneously. In one aspect, a system for learning to play a string instrument is provided that includes a simulation instrument comprising a plurality of strings and comprising of at least one video camera in communication with at least one processor (and software) to receive and interpret data and a signal from at least one of the video camera(s), to at least one or more of: track, map, and capture precisely at least one or more of: in real-time and thereafter activity/action performed/taken place, when, where, and how the at least one or more of: activity, movement, positioning, physical manipulation, pressure applied, touching, picking, fingerpicking, stroking, strumming, plucking, scratching, vibrato, vibrations, pull-off, hammer-on, muting, pressing, bending, sliding, slapping, tapping, lifting, pulling, physical technique, action to at least one or more string(s) and a tremolo, a user performs with at least one or more hand(s), finger(s), fingertip(s), fingernail(s), pick, slide or accessory, and determine and display on an interface screen therefrom or thereon, when, where and how a user performs at least one or more precise physical activity/action(s) (referenced above); and to visually display on an interface screen a vided simulation of the activity performed in real-time to at least one of: determine, demonstrate, assist, train, teach, suggest or guide the user correct, modify or improve the at least one of: activity or technique, if and as the at least one improper, inaccurate, accidental or incorrect activity was performed with the at least one hand, finger, fingertip, fingernail, pick, slide or accessory; and To visually display on an interface screen a video simulation of activity already performed to determine and provide at least one of: precise analysis, visual guide or demonstration to correct, modify or improve at least one of: activity or technique, if and when the at least one improper, inaccurate, accidental or incorrect activity was performed with the at least one hand, finger, fingertip, fingernail, pick, slide or accessory.

In at least one embodiment, wherein the simulation instrument comprises at least one pressure, force or tension sensor, at least one or both: at an end of or connected to, at least one of: one or more string(s) and a tremolo, that measures at least one of: pressure, force or tension of or on at least one of: one or more string(s) and the tremolo.

In at least one embodiment, wherein at least one pressure, force or tension sensor in communication with and is interpreted by at least one processor (and software) to receive a signal from at least one pressure, force or tension sensor, to measure and display on an interface screen a video simulation of at least one or both of: activity performed in real-time and thereafter performed/taken place: the pressure, force or tension applied to or removed from at least one of: one or more string(s) and the tremolo; and measures and displays on an interface screen a video simulation of at least one of: pressure, force or tension of or on the at least one of: one or more string(s) and the tremolo, to determine at least one change, difference, adjustment or variation of, in or to the pressure, force or tension thereon or therefrom; and Displays the proper pressure, force or tension of at least one or both of: one or more string(s) or that should be applied to/against one or more string(s).

In at least one embodiment, wherein the simulation instrument comprises of a fretboard wherein comprising at least one touch-sensing sensor in communication with and interpreted by at least one processor (and software) to receive a signal from at least one or more touch-sensing sensor(s) and determine therefrom or thereon when and where a user's at least one or more hand(s), finger(s), fingertip(s), fingernail(s), pick or accessory presses, touches or applies sufficient pressure, force or tension on at least one or more string(s) to touch/press against/make contact with at least one or more fret(s) of: for the entirety of a fretboard, from a Head to an End of last fret, 22nd or 24th fret.

In at least one embodiment, wherein or whereon at least one or more touch-sensing sensor(s) determine(s) that at least one or more string(s) being touched by a least one or more finger(s), fingertip(s), hand(s), fingernail(s), pick or accessory touches/presses against/on, applies pressure, force or tension to, or makes physical contact, at least one or both of: in real-time and thereafter performed/action taken place, with at least one or more fret(s): for the entirety of fretboard, from a Head to an End of the last fret, 22nd or 24th fret on/of the simulation instrument.

In at least one embodiment, the system, wherein or whereon at least one or more fret(s) or the entire fretboard comprise(s) of a plurality of touch-sensing sensors in communication with and interpreted by at least one processor (and software) to receive a signal from the plurality of touch-sensing sensors to capture/determine/measure therefrom or thereon which, when, and where a user's, at least, one or more finger(s), fingertip(s), hand(s), fingernail(s), pick or accessory on/against at least one or more string(s) touches, presses, is touching/pressing against, applying pressure, force or tension to, or making physical contact with/to, at least one or both of: in real-time and thereafter performed/action taken place, the at least one or more fret(s) on the simulation instrument.

In at least one embodiment, the system, wherein, whereon, whereby or wherefrom the fretboard is at least one of: preexisting/manufactured/already assembled as part of the simulation instrument, attached to/against/over a pre-existing/manufactured fretboard of an instrument, a replacement for/supplement to, or an alternative for a fretboard/neck.

In at least one embodiment, the system, wherein at least one or more touch-sensing sensor(s) or plurality of touch-sensing sensors is/are in the form of a touch-sensitive material that has a length that extends along at least one or a plurality of positions along the simulation instrument wherein or whereon the touch-sensing's material length would be at least one of: for the entirety of a fretboard, from a Head to an End of last fret, 22nd or 24th fret, and from the end of the last fret; 22nd or 24th fret, to a Bridge, or at least one or more fret(s) individually or combined/connected/together.

In at least one embodiment, The system, wherein the system (and software) determine(s) and precisely capture(s), at least one or both of: in real-time and thereafter performed/taken place, when and where a user's at least one or more finger(s), fingertip(s), hand(s), fingernail(s), pick or accessory is pressed, pressing, touched, touching, moved or is moving along the at least one or more string(s) placed, touched, pressed, moved, applied against or along at least one or more fret(s) or fretboard; and visually demonstrates/displays to the user on an interface screen the at least one or more correct/proper: movement(s), touch, touches, activity, press, presses or application(s) on/to/against the at least one or more string(s) placed, touched, pressed, moved, applied against or along at least one or more fret(s) or fretboard, and displays on an interface screen when and where the user's at least one of: finger(s), fingertip(s), hand(s), fingernail(s), pick or accessory should move, be moving, touch, be touching, apply, be applying, press or be pressing the at least one or more string(s) to/against/on/along at least one or more fret(s) of fretboard.

In at least one embodiment, the system, wherein or whereon the simulation instrument comprises a fretboard/neck and wherein or whereon the fretboard/neck comprises at least one or more sensor(s) on a back of/behind the fretboard/neck for determining a placement of the user's thumb on the back of/behind the fretboard/neck.

In at least one embodiment, the system, comprising at least one or a combination of an amplifier, a wah pedal and a basic tap pedal, use(s) of which is/are displayed by the system on an interface screen.

In at least one embodiment, the system, wherein the simulation instrument comprises of a fretboard and wherein the fretboard comprises of at least one LED strip located under at least one string that lights to show the proper location of the user's finger(s) or fingertip(s) on a string or strings.

In at least one embodiment, the system, wherein or whereon the simulation instrument comprises of a fretboard/neck and wherein or whereon the fretboard/neck comprises a plurality of sensors for capturing movement of a user's hand along back of the fretboard/neck and the system displays the captured movement on an interface screen along with a proper movement of the user's hand along the back of the fretboard/neck.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 1 illustrates a computing system according to an embodiment of the present invention.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

One embodiment of the present invention provides for a user apparatus, e.g., a simulation instrument, that emulates a real musical instrument, for example, the size, weight and shape and feel, and even works as a real instrument (such as an acoustic, electric, and bass guitar or other instruments). In at least one embodiment, the instrument and/or the systems determines, tracks, maps, analyzes, interprets and optionally shows a user exactly what the users hands and/or fingers are doing in real-time, have already done, and should be doing on the simulation instrument, for example, on a display associated with the system, in real-time, thus providing a way for the user to compare his or her real-time activity, (or post-activity analysis) with the virtual instruction's activity via the software and computer/game system working in conjunction with the instrument, which provides the user with the means to see, hear, execute and compare (mimic) the instrument activity. A user may be required to use a simulation instrument with 6 strings and 22 (or 24) frets (132 notes for 22 frets/144 notes for 24 frets)/Bass instrument, 4-stringed bass and 22 (or 24) frets (88 notes for 22 frets or 96 notes for 24 frets).

FIG. 1 illustrates a computing system according to an embodiment of the present invention. Instrument 100 may include video cameras 101, tremolo 102, output jack 103, connectivity processor unit 108, and tuners 111. Connectivity processor unit 108 is operable establish communication to gaming console/computer system 500 via a network connection. Instrument 100 may be communicatively connected to amplifier 200, wah pedal 300 and basic tap pedal 400 via the network connection. Amplifier 200 may also be connected to gaming console/computer system 500 via the connection. The network connection may be any suitable type of network allowing transport of data communications across thereof. The network may couple devices so that communications may be exchanged, such as between a server and a client device or other types of devices, including between wireless devices coupled via a wireless network, for example. In one embodiment, the network may be a network, following known Internet protocols for data communication, or any other communication network, e.g., any local area network (LAN), or wide area network (WAN) connection, wire-line type connections, wireless type connections, e.g., WiFi, Bluetooth, etc., or any combination thereof. Output jack 103 enables compatibility with other amplifiers and pedals (not illustrated). Instrument 100 may be any stringed instrument (acoustic and electric) and bass.

Pressure/Tension Accuracy (of Strings & Tremolo)

Pressure/tension sensors 106 may be placed inside of where the end of each string (6 strings—the 6 holes) connects to the instrument body, as well as underneath/inside where the tremolo 102 connects to the instrument body. These pressure sensors will allow software to determine: specific amount of pressure that is being applied to each string or strings and/or tremolo at any given time in real-time (which can be compared to the amount of pressure that should be placed at that time or any given time in real-time), specific amount of pressure each finger/fingers and finger tip/tips is applying to a specific string, on a specific fret at a specific time in real-time (which can be compared to the amount of pressure each finger/fingers and finger tip/tips should be applying at that time or any given time in real-time), and specific/appropriate tension required for properly tuning strings—to sense if instrument is in-tune to assist in standard, alternate and all possible tuning variations (which also allows for the correct notes, chords/exercises to be played based on proper tuning). The sensors determine the amount of real-time pressure against or taken off any string/strings/tremolo on or off/against any fret/frets to enable player to view movement, technique and form to learn to play vibrato, hammer-ons, pull-offs, bends, trills, slides, etc. The sensors also determine the amount of real-time pressure/force against or taken off any string/strings to enable player to view and properly execute movement, technique and form to learn to pick, stroke, strum, pluck, tap, slap, scratch, etc correctly.

Touch Accuracy (of Strings: Fingering & Playing Hands)

Two lengths of touch-sensing string (with touch-sensitive coating/material) 104 and 105 may be placed on each of the 6 strings—1 of the lengths of touch-sensing string (the length of which may represent the entire length of the fretboard: from the Head to the end of the last fret; $22^{nd}$ or $24^{th}$ fret) can determine where each of the player's fingers are applying pressure (making contact) on any string/strings—the exact placement of where the finger/fingers and finger tip/tips are making contact with any string/strings at any given time, in real time. The $2^{nd}$ length of touch-sensing string (the length of which may represent from the last fret; $22^{nd}$ or $24^{th}$ fret to the Bridge; where the end of the string meets the instrument's body) can determine which string/strings the playing hand's fingers/finger tips/pick is touching and where it is being touched. LED strips 112 located under each of the strings, stretching across the length of the fretboard will serve to show which string(s) (by lighting up) should be touched, and also function as a corrective measurement if the player is not touching the correct string(s), the lights will be used to show the correct string(s). The touch-sensitive coating/material 104 and 105 on the strings determines proper real-time finger positioning/placement/movement on specific strings to learn to play harmonics, notes, chords, etc Touch Accuracy (of Front/Back of Fretboard/Frets)

Touch sensors (which may consist of one or more resistive-touch sensors/one or more lengths of resistive-touch film/one or more lengths of resistive-touch tape and/or one or more capacitive-touch sensors/one or more lengths of capacitive-touch film/one or more lengths of capacitive-touch tape) will be placed throughout the entirety of all frets—front of the fretboard includes touch-sensing plates 107a and behind the fretboard/behind the neck includes touch-sensing plates 107.b (to detect thumb placement) above, beneath, below and in between each of the six strings, which will allow the system to: determine where any specific string/strings touch against any given fret/frets (against the fretboard), at any given time in real-time (which can be compared to where any of the 6 strings should be pressed against any fret/frets at any given time in real-time), and determine where the player's thumb is being placed on the back side of the fretboard/neck when the player's other four fingers (of their fingering hand) are being used to play notes, techniques, chords, exercises at any given time in real-time (can be compared to where the player's thumb should be placed in real-time). The touch-sensing plates within and behind the fretboard/instrument neck determines proper finger/fingers and finger tip/tips' and thumb's placement/positioning/movement to learn to properly play notes, chords, techniques (where to hammer-on, pull-off, trills, vibrato, bends, slides) etc.

Movement, Positioning & Technique Explanation (Game/Education Applicability)

One embodiment of the present invention may determine and/or indicate, for example, on an interface screen or display, where each of the player's utilized fingers are at all times in real-time (to be compared to where each of the five fingers, of both hands, should be when touching and/or grasping the instruments fretboard/fingerboard/body/neck, as well as compared to user's post-activity analysis). Indication may include if any part of any of the five fingers is touching (with any degree of intensity) the instrument front/back of the neck, string/strings, it should indicate where that/those finger(s) should be placed when in 'anticipatory mode' as a corrective and assistive measure. When playing a note or a chord, the sensors and video cameras can indicate which part of each specific finger and the specific placement of each specific finger tip is being placed against any specific string(s) on any specific fret(s) at any given time in real-time in comparison to where and the proper positioning of how each specific finger and fingertip should be placed. When a specific part of any finger/fingers and/or finger tip/tips is not making contact with the instrument (that should be), there may be a video image generated that shows exactly where each finger and fingertip is in real-time and the software may indicate where and the specific positioning of where and how each finger and finger tip should be placed and whether it should be touching the instrument/specific fret or specific string(s) or even if it's not making contact with the instrument/fretboard/strings because the player should be made aware by the system at all times, where the hand, fingers and finger tips should be placed and where they will need to be placed next and the correct positioning and timing to do so. When the hand, specific fingers, thumbs and finger tips move up and down the instrument neck, the player should be made aware by the system exactly where each specific finger, finger tip, thumb; the proper positioning of each specific finger, hand, fingertip, pick should be. The software may generate an image demonstrating which part of the skin on the player's hand should be touching the instrument neck, specific fret(s) or specific string(s) at any given time in real-time. When the player looks up at the screen, he/she is able to see an exact, real-time image of what his/her hand, wrist, skin, fingers and fingertips are doing in relation to where everything should be placed as it moves up and down the instrument neck. When the player looks up at the screen, he/she is able to see an exact, real-time capture of their hand's, wrist's, skin's, fingers' and fingertips' movements as the player pushes against a specific string/strings, which the player presses/moves against any specific fret/frets and against front/back of the instrument neck in a specific direction. The player should also be informed by the system whether they are applying the appropriate amount of pressure (whether gentle or intense) against the string/strings to enable the player to mimic the exact, proper movement and technique being taught: i.e. vibrations, pull-offs, hammer-ons, slides, finger taps, hand slaps, string muting, etc, in relation to where everything should be placed and exactly how everything moves.

Video for Playing Technique Accuracy (Playing Hand)

Video cameras 101 may be placed to the left/right/side of the playing hand and the fret-fingering hand (above/beneath), which will: capture/map/track/display which part of any of the player's five fingers and/or fingertips, hands/pick is touching any specific string at any given time in real-time (to be compared to a video image showing which parts of any of the player's finger(s)/hands/pick/fingernail or fingertip(s) should be touching the instrument or strings at any given time), and capture/track/map/display exactly how any part of the players finger(s) fingers(s)' tips and the exact finger/hand positioning is being executed while touching the instrument or specific instrument strings in real-time (to be compared to a video image showing exactly how the player's fingers/finger tips/hand positioning should be executed) to provide video accuracy. Video accuracy may, display exactly how which specific fingers/finger tips are gripping the instrument pick/string/strings in real-time (to be compared to a video imagine showing how the fingers/finger tips should be gripping the instrument pick/string/strings), display exactly how the fingers'/hand's movement is executed when using the instrument pick to stroke any specific string/strings at any given time in real-time to utilize a specific technique to achieve a specific sound (to be compared to a video image showing how the fingers'/hand's movement should be executed when using the instrument pick at that specific time), display exactly how the fingers and hand is gripping any particular string (various strings) or instrument pick in real-time (to be compared to a video image showing how the fingers and hand should be gripping the string (various strings) or instrument pick), display exactly how the fingers and hand and/or instrument pick are being positioned/and moved in real-time/how the fingers gripping the instrument pick in real-time are moving against the instrument and specific strings at a specific time within a specific rhythmic sequence and technique to achieve a particular sound (to be compared to a video image showing how the fingers and hand and or instrument pick should be positioned and moved/how the fingers should grip the instrument pick to achieve that particular sound), display exactly how any particular finger and/or finger tip placed against any particular instrument string (various strings)/is gripping a instrument pick and makes contact with a particular string (various strings) in real-time (to be compared to a video image showing how the fingers and/or finger tips and/or instrument pick should make contact with the instrument or specific string (various strings) to achieve a particular sound), and display when any finger/fingers, finger tip/tips, instrument pick is used to tap/make contact with a string/strings against any specific fret/frets to execute proper tapping technique (to be compared to a video image showing the proper finger/fingers/finger tip/tips and/or pick properly displaying correct tapping for exercise). The video accuracy determines the proper real-time playing-hand technique to enable player to view, properly execute and learn physical, visual movement, technique and form to learn to properly pick, stroke, strum, pluck, tap, slap, scratch, etc.

Touch-sensor 109 on the surface of the wah pedal 300, which will work in tandem with sound processing to replicate the specific sound manipulation associated with the corresponding position. The specific position of the pedal will correspond with a real-time visual representation of where the player's toes and heel are pressing against the (corresponding front and back portions of the pedal). Playing a specific note(s), chord(s), etc at a specific time(s) while adjusting the specific position of the wah pedal at a specific time(s); this is what allows the player to create the desired sound, achieved by a education/game software in order to replicate the specific technique and sounds that correspond to the songs and exercises in the associated education software and video game.

A basic tap pedal 400 will have a touch-sensor 109 placed inside the pedal, which will indicate when the foot pedal has been turned-on/activated and/or when the foot pedal has been turned-off/deactivated. In order to turn-on/activate/turn-off/deactivate the foot pedal, the player must use their foot to press against the foot pedal to connect with the touch sensor (works as an on/off switch).

The amplifier 200 will have a few adjustable tuning knobs 110; one of which must be a "gain" knob. Each knob will be able to detect when it has been adjusted to the required adjustment-degree in order to enable the player to create the desired/required sound to properly play the appropriate note, sound, chord, exercise, etc at the appropriate time that it is requested in the education software and video game. Specific knobs, such as the "gain" knob's proper adjustment is what enables the player create "feedback" loops between the instrument and amplifier.

A display screen connected to gaming console/computer system 500 may display a simulated digital image of an instructor/director (step-by-step display & up-next preview). Display of a user's hands in real-time, showing both hands' movement (fingers+thumbs), anywhere on the instrument. Enabling the user to actively mimic the director's instruction by lining-up a user's real-time hand/finger movement with simulation instruction hand/finger movement (a step-by-step walk-thru guide with a visual, auditory and touch-sensor aids).

Real-time touch sensors (and pressure/tension sensors placed inside of where the string connects to the instrument body) (& video cameras for playing/picking hand and fret-picking hand) will be embedded within and behind each fret (cameras, located on the instrument body): they will capture the real-time positioning/movement/placement of both hands, and each specific finger/fingertip/fingernails/pick as it moves about the surface of the instrument's fret board. Both hands and each specific finger's movements will be displayed: the simulated instructor's hands and specific finger movement of each hand will be shown in proper-timing on the display screen (each of its associated specific fingers' movement, with an accurate, correct-time image displaying what the user should do). The display screen will be fed information from the gaming console/computer system 500, which will receive pre-programmed instruction-exercises, and real-time data, which a user will control. Game and education mode for playing the instrument can be programmed for both right-handed and left-handed instrumentalists.

Fingering Hand and Playing-hand data will capture the real-time action of the user's actual placement of thumb(s), hand(s), fingertip(s), fingernail(s), pick and fingers' movement, as fingertips press against strings, and when specific strings touch any specific fret(s), showing which frets, which strings are pressing against, displaying which finger/fingers is/are making contact (as it's making contact), how it's making contact, how it's moving and its technique. Displaying the fingering-hand's thumb placement on the instrument neck, as it slides up and down the neck of the instrument. Displaying the fingering-hand's palm pressing against the instrument's neck, and the fingering-hand's fingers and finger tips as they press against strings, which are pressed against frets, and/or slid up and down the instrument's neck, while pressing against specific strings and frets. The fingering-hand's/fingers' real-time action/movement will feed data which will be sent via blue tooth to software interface module, which will send data to be displayed on the associated monitor. Playing hand and fingers'/finger tips' movement will feed real-time hand and finger/fingertip/instrument pick data, as real-time contact is made with the instrument and strings, which will feed real-time data to software interface module via the instrument. Software module will display real-time data on monitor/display screen.

The image on top may be the instruction display, which will consist of pre-programmed information: exercises programmed into software, directing the user. These exercises are not in real-time, as they are instructional. They are accurate-timing representations demonstrating exactly what the user must play, step-by-step.

Front of the Neck

Touch sensors, which may consist of one or more resistive-touch sensors/one or more lengths of resistive-touch film/one or more lengths of resistive-touch tape and/or one or more capacitive-touch sensors/one or more lengths of capacitive-touch film/one or more lengths of capacitive-touch tape on the front of the neck will sense the touch/ movement of each and every specific finger as they move to different frets and strings. Since each of the user's specific finger's movement will be displayed in real-time, it will allow a user to be sure of the correct finger placement, which is essential because the correct finger-placement makes playing much easier, and oftentimes . . . . Certain exercises and chords would be impossible to play without proper finger-placement. A user will see exactly where, how and when the instructor places each specific finger on specific frets and strings, and the user can match his/her real-time specific finger/hand placement with the instructor's. The activity may not resume until the user accomplishes the activity, one step at a time (certain exercises may include various alternate exercise/chord structures in case a player's hand may not be large enough to play certain chord shapes).

Back of the Neck

The fretboard/neck is at least one of: preexisting/manufactured/already assembled as part of the simulation instrument, attached to/against/over a pre-existing/manufactured fretboard of an instrument, a replacement for/supplement to, or an alternative for a fretboard/neck. Thumb placement is very important. Most of the time, self-taught players teach themselves incorrectly, which is why they often will hit a plateau, hindering their ability to improve. Many times, development of improper technique will lead to injuries, a lot of which are caused by incorrect thumb placement. Therefore, there will be touch sensors which may consist of one or more resistive-touch sensors/one or more lengths of resistive-touch film/one or more lengths of resistive-touch tape/material and/or one or more capacitive-touch sensors/ one or more length of capacitive-touch film/one or more lengths of capacitive-touch tape located throughout the entirety of the back of the instrument's neck, which will allow the user to match-up their real-time thumb placement with the correct thumb-positioning shown by the instructors display. Touch sensors in and behind the fretboard+touch sensors on the strings, will display where the fingers and hands are making contact/being placed on the strings, and which strings, and where the strings touch specific frets, and where the thumb and hand touch/grip/are placed against the back of the fretboard on the instrument. The visual, real-time image of the instrument player's hands/fingers will be accurately shown on the display screen.

This will show the digital instructions hands and fingers on the instrument, and the image below will show the user's hands and fingers, as contact is made, showing exactly where the fingers and hands are touching the instrument strings, fretboard and neck. This will allow the user to analyze where his/her fingers and especially thumbs should be placed on the instrument and will be able to physically line-up their exact finger placement of each specific finger in real-time (as they're doing it) with what the visual instructor's exact hand and specific finger movement is showing the user.

Front and Back of the Neck

The fretboard is at least one of: preexisting/manufactured/ already assembled as part of the simulation instrument, attached to/against/over a pre-existing/manufactured fretboard of an instrument, a replacement for/supplement to, or an alternative for a fretboard/neck. Touch sensors which may consist of one or more resistive-touch sensors/one or more lengths of resistive-touch film/one or more lengths of resistive-touch tape and/or one or more capacitive-touch sensors/one or more length of capacitive-touch film/one or more lengths of resistive or capacitive-touch sensing material on the front and back of the neck will sense the touching of fingers and fingertips, fingernails, picks, hand(s) and thumb(s) as they touch specific string(s) and when specific string(s) touch any specific fret(s) and the specific thumb placement behind the fretboard. The sensed data will be displayed on the by the monitor which interprets the information from the game/computer system, which captures the hand and finger activity on the instrument/device. This allows the user to see a real-time image of the specific fingers he/she is using as each specific finger/hand/pick/ fingernail is placed and moved on the front of the neck. The fingers' touch (beginning and endpoint) and pressure/tension will be captured by the sensors attached to the strings: the information will be interpreted as the image of the moving hand and specific fingers on specific strings and specific frets.

Foot Pedal(s), Wah Pedal(s) & Amplifier

A digital image/video may display foot/pedal activity, providing real-time direction and real-time display of your foot/pedal activity, shown adjacent to hand activity. A digital imagine will display foot/pedal activity, providing real-time direction and real-time display of your foot/pedal activity, shown adjacent to hand activity, as well as a comparison of post-activity visual feedback related to incorrect/correct user activity to be compared to directions/exercise given. The present invention may be embodied as an educational program and competitive video game that provides various respective sound outputs/effects to work in conjunction with the appropriate instrument, sound-effects, pedals, and amplifier.

A screen may be connected to gaming console/computer system to display (via software capabilities) images with a vertical or horizontal separation.

Display of Next Riff/Phrase/Verse

A virtual simulation of a fret board+audio clip of the musical phrase/verse, accompanied by a representation of a digitally-simulated instrument player's hands/fingers'/fingers' tips' movements/actions. Instructor's hands/detailed finger movements may be displayed by light/shadow (translucent) movement that contrasts with the color of the strings, (on simulation fret board), indicating where the player's hands/fingers/fingers' tips are on the instrument/strings/neck/body. Up-next preview may give a user a 'heads up' for where the hands and fingers will be moving next. The user will be prepared for each step of every exercise. Usage of translucent shadows/images, different shades of light, and/or various visual techniques, the present invention will make it easy to distinguish every visual component of the exercise. Instruction: Step-by-Step Directional Hands/Fingers/Fingers' Tips Display Virtual representation of fretboard, demonstrating director's hands/fingers' movement/activity of both hands. The user may emulate by lining-up its hand/finger activity with step-by-step directions. Step-by-step directions may show the exercise written in musical staff and/or tablature. As the user places its hands and fingers in the correct place, completing the exercise's directions, each note/tab being played by the user can become bold. This allows the user to associate written notation and/or tablature with its relative sound. As each proceeding correct note is played by the user, the screen may display the following correct hands'/fingers' movement (it can repeat the 'next step' until the user successfully plays the exercise correctly). If the user takes an extended duration of time to complete the exercise, the software may display exercise at varying angles to allow user to view demonstration from multiple viewpoints until the exercise is successfully completed hand/finger activity.

User—Real-Time Sensor Display

A virtual representation of a user's simulation instrument, demonstrates the user's hand/finger activity in real-time, simultaneously indicating what the user's hands/fingers should be doing. On the bottom middle section of the screen may display large, bold, and/or staff music notation of the current verse being learned & its corresponding letters.

Real-Time Music Staff and/or Tablature Display

The screen may show the musical phrase/instrument riff/measure/exercise in staff and/or tablature. Any note that user plays, may be transcribed to accurate real-time staff and/or tablature notation (which allows user to learn the music language actively). As the user plays each correct note of the exercise, that note will 'light up' in its relative place on the screen.

Real-Time Music Staff and/or Tablature Display:

This technology/tool will be very helpful in a non-directional improv mode: allows the user to see the music notation and/or tablature, as it's being played.

The present invention includes an educational technology provides its user the environment in which it learns by using all three pertinent senses: sight (reading), hearing, and touch/feeling/pressure/movement (real-time). Sensors embedded within the simulation instrument may display a real-time feed, demonstrating user's hands/fingers activity, which they will compare with directional hand/finger activity. Depending on the user's preference, the viewpoint/angle being used to see what the director is doing, can be changed. Some users may find it easier to view simulation instrument image from:

The vertical (suggested) perspective, in which case, the instrument image may have a 3-dimensional demonstration, composed of transparent/translucent instrument neck/fret board, and white or yellow coated simulation-strings—the simulation hands/fingers may be represented by translucent dark shadowing hands/fingers allowing the user to see what is being done to the strings by the hands/fingers simultaneously. This perspective allows the user to see the directions from the same perspective it has when it looks at its hands are actually doing. The horizontal perspective allows the user to view a solid simulation instrument fretboard/neck accompanied by a translucent color contrast between simulation strings and hands/finger activity.

Simulation Instrument(s)/Bass:

The simulation instrument may represent and be usable as a real instrument. Its shape, size, and feel/appearance can emulate a real instrument and the weight may be similar to a real instrument. Because ultimately, the user must be able to make an easy, smooth and natural/effortless transition from the simulation instrument to a performance instrument. This instrument(s)/bass will be usable as a real instrument.

Aesthetics:

The instrument according to embodiments of the present invention may be designed to look like a stringed-instrument one would buy in any musical equipment store, with a real instrument's neck and string set-up. Options include simulation acoustic instrument, customized simulation acoustic instrument, simulation electric instrument, customized simulation electric instrument, simulation electric bass, and customized simulation electric bass.

Game/Program Modes

Education Mode:

Instrument can be taught at all levels: Beginner-Intermediate-Advanced (and levels in between). Levels can be sold, separately or as a package and may teach, picking, tuning, stringing, finger picking, strumming, plucking, soloing, tapping, slapping, hammer-ons, pull-offs, trills, vibrato, chords, slides, tremolo/Whammy bar, the slide, wah pedal, one-tap (basic) pedal(s), amplifier/other, . . . etc. This will feature exercises, which will become progressively more challenging as the player advances. However, the player will be guided every step of the way in becoming a real instrumentalist—this is a fail-proof method to learn instrument Practice with the Band/Jam Mode:

Approximately 10-15 songs at PLAYER 1's disposal+ additional songs can be purchased from an online store.

Learn, practice and compete with computer within a studio-setting mode:

This will teach tempo and help user to learn to play the song correctly. This mode may feature a virtual band within a recording-studio setting. There will be a simulated bassist (on an as-needed basis), drummer, soloist, and additional instruments (on an as-needed basis). Each instrument player will play its relative part, providing a soundtrack without the instrument elements. When the user feels ready to play songs, it will be guided, step-by-step, from beginning to end through any of the featured songs.

Improv Mode:

The band (drummer, bassist and rhythm instrumentalist) provide the melody, so the user can learn pre-written solos, and practice improvising, using the knowledge her/she has gained. This mode will also feature a virtual band within a recording studio setting. There will be a simulated bassist (on an as-needed basis), drummer, soloist, and additional instruments (on an as-needed basis). Each instrument player will play his/her relative part, providing a soundtrack without the instrument elements. The user can learn and practice the art of improv.

Competition Mode:

This is intended to create an international competition and generate money for participating competition locations and the music industry. Users at all skill levels can compete nationwide, and potentially, internationally to attain a level of skill ranking. An instrumentalist competition mode may be sold at select entertainment/bar/pub/club venues that participate with instrumentalist global or national competitions. Players at all skill levels can pay/enter to compete at participating locations. Competitions can be sponsored.

Songs used in every mode provide legal royalties to the appropriate parties in the music business: all song versions (sold separately—practice and competition modes) may require purchase. This will also help generate revenue for the music business.

Song repertoire provides songs with rhythm direction and solo-optional direction.

Solo No-Direction:

While each competitor or band member must choose rhythm or solo . . . rhythm may be standard for each song (either it is played correctly or incorrectly) . . . . In order for exercises to be completed, they must be played correctly. The rhythm part will be given feedback (positive or negative) from the digitally simulated crowd, and the overall-score will be based on accuracy of performance. However, the solo element will be scored based on rhythm accuracy, relevant scale-usage and riff quality.

Soloing with Direction:

Soloist may choose to play the solo written by the song's actual artist. If so, may replicate the directional solo—its score may be determined by the accuracy of its performance. The crowd will provide positive or negative feedback based on performance accuracy.

If two instrumentalists want to compete/play in a competitive or team-effort video game setting—one instrumentalist plays the rhythm, while the other solos; both competitors will be competing in performance of rhythm and solo/improve Band-Performance and Career Modes:

Multiple Players can be active in a career mode, allowing the user(s) to gig for money, which may be used to purchase and unlock additional songs, additional instruments and different/new effects to use with pedals. Depending on the quality of the user's(s') performance(s), they will be prompted to play additional gigs at different venues/arenas—the better the performance, the better the following gig offers. Bad performances will result in less money being offered for future gigs. Performances will determine player reputation or rating, which determines how much money they will be offered and what gigs they will be offered, and will also determine the venue To concentrate visual focus on the video game competition and visual gig performance. May display a moving metronome, which will slide from left to right across an instrument tablature indicator & staff indicator. Displays a directional hand on a simulated fret board showing/teaching correct movement at its relative/correct timing. Displays the user's real-time performance.

FIG. 1 is a conceptual illustration allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A system for learning to play a string instrument comprising a simulation instrument that comprises a plurality of strings and comprising at least one device in communication with at least one processor to receive and interpret data and a signal from the at least one device, to at least one or more of: track, map, or capture precisely in real-time activity/action performed/taken place, at least one or more of, when, where, or how the activity/action was performed/taken place; the activity/action includes at least one of: movement, positioning, physical manipulation, pressure applied, touching, picking, fingerpicking, stroking, strumming, plucking, scratching, vibrato, vibrations, pull-off, hammer-on, muting, pressing, bending, sliding, slapping, tapping, lifting, pulling, or physical technique a user performs with at least one or more hand(s), finger(s), fingertip(s), fingernail(s), pick, slide or accessory to at least one or more of: at least one or more string(s) or a tremolo, and display on an interface screen at least one or more of: when, where or how a user performs the activity/action in order to provide corrective feedback;

wherein the simulation instrument further comprises a fretboard/neck and at least one device for capturing or sensing at least one movement or placement of a user's hand/finger(s)/thumb along a back of the fretboard/neck; and in response to any user error occurrence, visually displaying, a visual simulation of the activity/action performed in real-time to at least one of: determine, demonstrate, assist, train, teach, suggest or guide the user to correct, modify or improve the activity/action as the at least one improper, inaccurate, accidental or incorrect activity is performed with the at least one hand, finger, fingertip, fingernail, pick, slide or accessory by determining or providing at least one of: precise analysis, visual guide or demonstration to correct, modify or improve at least one of: activity or technique, when the at least one improper, inaccurate, accidental or incorrect activity is performed with the at least one hand, finger, fingertip, fingernail, pick, slide or accessory;

otherwise visually reinforcing/acknowledging correct/accurate/appropriate user activity.

2. The system of claim 1, wherein the simulation instrument comprises at least one pressure, force or tension sensor, at least one or both: at an end of or connected to, at least one of: one or more string(s) or a tremolo, that measures at least one of: pressure, force or tension of or on at least one of: one or more string(s) or the tremolo.

3. The system of claim 2, wherein the at least one pressure, force or tension sensor(s) in communication with or is interpreted by at least one processor to receive a signal from at least one or more of: pressure sensor(s), force sensor(s) or tension sensor(s), to display on an interface screen a visual simulation of at least one or more of: the pressure, force or tension applied to or removed from at least one of: one or more string(s) or the tremolo; and performed in real time to determine at least one change, difference, adjustment or variation of, in or to the pressure, force or tension thereon; and display a proper pressure, force or tension of at least one or both of: one or more string(s), or that should be applied to/against one or more string(s).

4. The system of claim 1, wherein the fretboard comprises at least one touch-sensing sensor, in communication with or interpreted by at least one processor to receive a signal from at least one or more touch-sensing sensor(s) to determine at least one or more of: when or where a user's at least one or more hand(s), finger(s), fingertip(s), fingernail(s), pick or accessory presses, touches or applies sufficient pressure, force or tension on at least one or more string(s) to touch/press against/make contact with at least one or more fret(s) for the entirety of a fretboard.

5. The system of claim 1, wherein at least one or more touch-sensing sensor(s) determine(s) that at least one or more string(s) being touched by a least one or more of: finger(s), fingertip(s), hand(s), fingernail(s), pick or accessory touches/presses against/on, applies pressure, force or tension to, or makes physical contact: in real-time with an entirety of the fretboard/neck of the simulation instrument.

6. The system of claim 1, wherein at least one or more fret(s) or the entire fretboard comprise(s) a plurality of touch-sensing sensors in communication with and interpreted by at least one processor to receive a signal from the plurality of touch-sensing sensors to at least one or more of: capture, determine, or measure thereon, at least one or more of: which, when, or where a user's, at least, one or more finger(s), fingertip(s), hand(s), fingernail(s), pick or accessory on/against at least one or more string(s), at least one or more of, touches, presses, is touching/pressing against, applying pressure, force or tension to, or making physical contact with/to: in real-time, the at least one or more fret(s) on the simulation instrument.

7. The system of claim 1, wherein the fretboard is at least one of: preexisting/manufactured/already assembled as part of the simulation instrument, attached to/against/over a pre-existing/manufactured fretboard of an instrument, a replacement for/supplement to, or an alternative for a fretboard/neck.

8. The system of claim 7, wherein at least one or more touch-sensing sensor(s) or plurality of touch-sensing sensors is/are in the form of a touch-sensitive material that has a length that extends along at least one or a plurality of positions along the simulation instrument whereon the touch-sensing's material length is at least one of: for the entirety of a fretboard, from a Head to an End of last fret, 22nd or 24th fret, or from the end of the last fret; 22nd or 24th fret to a Bridge, or at least one or more fret(s) individually or combined/connected/together.

9. The system of claim 8, wherein the system at least one or both of, determine(s) or precisely capture(s) in real-time, at least one or both of: when or where a user's at least one or more finger(s), fingertip(s), hand(s), fingernail(s), pick or accessory is pressed, pressing, touched, touching, moved or is moving along the at least one or more string(s) placed, touched, pressed, moved, applied against or along at least one or more fret(s) or fretboard; and is able to visually demonstrate/display to the user on an interface screen at least one or more correct/proper: movement(s), touch, touches, activity, press, presses or application(s) on/to/against the at least one or more string(s) placed, touched, pressed, moved, applied against or along at least one or more fret(s) or fretboard, and displays on an interface screen at least one or both of: when or where the user's at least one of: finger(s), fingertip(s), hand(s), fingernail(s), pick or accessory should move, be moving, touch, be touching, apply, be applying, press or be pressing the at least one or more string(s) to/against/on/along at least one or more fret(s) of fretboard.

10. The system of claim 1, wherein the fretboard/neck comprises at least one or more sensor(s) on a back of/behind the fretboard/neck for determining a placement of the user's thumb on the back of/behind the fretboard/neck; and the system displays the placement on an interface screen; and in response to any correct/accurate/appropriate user thumb placement, the user is provided with visual acknowledgement/reinforcement;

otherwise, it provides corrective feedback for at least one or more user thumb placement, activity, or technique to be visually displayed on an interface screen, a visual simulation of the user's thumb placement to at least one or more of: determine or provide at least one of: precise analysis, visual guide or demonstration to correct, modify or improve at least one of: placement, activity or technique, when at least one improper, inaccurate, accidental or incorrect placement, activity, or technique was performed with the thumb.

11. The system of claim 1, comprising at least one or a combination of an amplifier, a wah pedal or a basic tap pedal, use(s) of which is/are displayed by the system on an interface screen.

12. The system of claim 1, wherein at least one or a combination of a simulation amplifier, a wah pedal or a basic tap pedal comprises at least one or more sensor(s) that is/are able to detect manipulation of a specific positioning of a pedal with consideration to specific timing at least one: user activity, movement, touch, adjustment, modification, application, placement, push, or press; and the system displays the detected manipulation of the specific positioning of a pedal with consideration to specific timing, the at least one: user activity, movement, touch, adjustment, modification, application, placement, push, or press on an interface screen; and in response to any correct/accurate/appropriate user activity, movement, touch, adjustment, modification, application, placement, push, or press, the user is provided with visual acknowledgement of such detected manipulation of the specific positioning of a pedal with consideration to specific timing; and otherwise, provides corrective feedback for at least one: incorrect user activity, movement, touch, adjustment, modification, application, placement, push, or press, which is visually displayed on the interface screen, as a visual simulation of the user's at least one: user activity, movement, touch, adjustment, modification, application, placement, push, or press and determines the detected manipulation of the specific positioning of a pedal with consideration to specific timing, or provides at least one of: visual guide or demonstration to correct, modify or improve at least one or more of such, when the at least one or more of improper, inaccurate, accidental or incorrect user activity, movement, touch, adjustment, modification, application, placement, push, or press takes place.

13. The system of claim 1, wherein the fretboard/neck comprises a plurality of sensors for capturing movement of a user's hand/fingers/thumb along a back of the fretboard/neck; and the system displays the captured movement on an interface screen along with a proper movement of the user's hand/fingers/thumb along the back of the fretboard/neck.

14. A method for learning to play a string instrument comprising: providing a simulation instrument comprising a plurality of strings and at least one device in communication with at least one processor to receive data and to at least one or more of: track, map or capture precisely in real-time at least one of: when, where, location(s), physical form(s), position(s) and technique(s), or how an activity/action is/are performed/taken place, the activity/action including at least one of: movement, positioning, physical manipulation, pressure applied, touching, picking, fingerpicking, stroking, strumming, plucking, scratching, vibrato, vibrations, pull-off, hammer-on, muting, pressing, bending, sliding, slapping, tapping, lifting, pulling, or physical technique a user performs with at least one or more of: hand, finger, fingertip, fingernail, pick, slide or accessory to at least one or more string(s) and determining and displaying therefrom when, where or how a user performs the activity/action;

the simulation instrument further comprising a fretboard comprising at least one or more fret(s) and at least one device for capturing or sensing at least one movement or placement of a user's hand/finger(s)/thumb along a back of the fretboard; and in response to any user error(s) occurring, visually displaying on an interface screen with a visual simulation of the activity/action performed/taken place in real-time to at least one or more of: determine, demonstrate, assist, train, teach, suggest or guide the user to correct, modify or improve the activity/action, as at least one improper, inaccurate, accidental or incorrect activity is performed with the at least one hand, finger, fingertip, fingernail, pick, slide or accessory, and includes a visual demonstration of the activity/action properly performed; and visually displaying on an interface screen, a video simulation of the activity/action performed to provide at least one of: precise analysis, visual guide or demonstration to correct, modify or improve at least one or combination of: activity, technique or position, in response to the at least one improper, inaccurate, accidental or incorrect activity was performed with at least one or more hand(s), finger(s), fingertip(s), fingernail(s), pick, slide or accessory;

otherwise, visually reinforcing/acknowledging correct/accurate/appropriate user activity;

wherein the simulation instrument comprising at least one pressure, force or tension sensor in communication with at least one processor to receive a signal from at least one pressure, force or tension sensor, at an end of at least one of: at least one or more string(s) or a tremolo, that is/are able to measure in real time at least one or more of: pressure, force or tension applied to or removed from the at least one of: at least one or more string(s) or a tremolo; and wherein at least one or more fret(s) comprise(s) at least one or more touch-sensing sensor(s) therein or thereon in communication with at least one processor;

receiving, with at least one processor in communication with the simulation instrument a signal from at least one or more touch-sensing sensor;

determining, with at least one processor at least one or both of, when or where on at least one or more string(s) or a tremolo, a user applies at least one of: pressure, force or tension to the at least one or more string(s) or a tremolo from the received signal; and displaying on an interface screen, at least one or more of: where, when or how on the at least one or more fret(s) or the entirety of the fretboard, the at least one or more string(s) is/are in real-time, at least one or more of: touched/pressed or being pressed/touched to/on/ against/along the string(s), or the measurement of pressure, force or tension applied, by a user's at least one or more of: finger(s), hand(s), fingertip(s), fingernail(s), pick or accessory, to/on/against the at least one or more string(s), and displaying, at least one or more of: where, how, location(s), physical form(s), position(s) or technique(s) on/to/against/along the at least one or more fret(s) or entirety of the fretboard, and displaying on an interface screen, at least one or more of: how, when or where the at least one or more string(s) should be pressed/touched/applied to the one or more fret(s) or fretboard by the user's at least one or more of: finger(s), hand(s), fingertip(s), fingernail(s), pick, slide or accessory; and in response to any correct/accurate/appropriate user activity, providing visual reinforcement/acknowledgement;

otherwise, providing corrective feedback in response to a user error occurring, to visually display on the interface screen a visual simulation of activity performed to provide at least one of: precise analysis, visual guide or demonstration to correct, modify or improve at least one of: activity/action when the at least one improper, inaccurate, accidental or incorrect activity is/was performed with the at least one hand, finger, fingertip, fingernail, pick, slide or accessory.

15. The method of claim 14, further comprising interpreting the signal from at least one touch-sensing sensor and determining that at least one or more string(s), in real-time, is/was touched/pressed by at least one or more hand(s) finger(s), fingertip(s), fingernail(s), pick, slide or accessory to/on/against/along the at least one or more fret(s) or the fretboard of the simulation instrument.

16. The method of claim 14, wherein the fretboard comprises at least one sensor on a back of the fretboard for determining a placement of the user's thumb(s), finger(s), fingertip(s), or hand(s) on the back of the fretboard; and in response to any user error(s) occurring, providing corrective feedback for such to be displayed on an interface screen as a video simulation of activity performed to provide at least one or more of: precise analysis, visual guide or demonstration to correct, modify or improve at least one or combination of:

activity, technique, or position, when at least one improper, inaccurate, accidental or incorrect activity/ placement/touch/application is performed in real-time with the user's at least one or more of, thumb(s), finger(s), fingertip(s), or hand(s) against the back of the fretboard, and displays of proper placement of at least one or more of, where or how the user's at least one or more of, thumb(s), finger(s), fingertip(s), or hand(s) should be placed;

otherwise, visually reinforcing/acknowledging any correct/accurate/appropriate user activity/action.

17. The method of claim 14, comprising at least one or more of: capturing, tracking, mapping using at least one or more visual activity detection device(s) in communication with the at least one processor to receive data, and at least one or both of: track or map precisely in real-time, at least one or more of: when, where, location(s), physical form, position(s) or technique(s) used, and at least one or both of: track or map precisely how the activity movement, positioning, physical manipulation, pressure applied, touching, picking, stroking, strumming, plucking, scratching, vibrato, vibrations, pull-off, hammer-on, muting, pressing, bending, sliding, slapping, tapping, lifting, pulling, physical technique, action a user performs with at least one or more hand(s), finger(s), fingertip(s), fingernail(s), pick, slide, accessory to at least one or more string(s) or plurality of strings of the at least one or both of: simulation instrument or a tremolo, displays therefrom at least one or more of: when, where, location(s), physical form(s), position(s) or technique(s) used and displays how a user performs at least one or more precise, physical activity with at least one or more hand(s), finger(s), fingertip(s), fingernail(s), pick, slide or accessory, and displays on the interface screen along with the proper activity/action(s)/performance(s) a user should perform/be performing.

18. The method of claim 14, comprising displaying on the interface screen at least one or more of: activity/action(s) performed in real-time, the user's performance accuracy, or a proper of at least one or a combination of: amplifier(s), wah pedal(s) and basic tap pedal(s).

19. A system of claim 1, wherein the system comprises at least one visual activity detection device.

20. A method of claim 14, wherein the system comprises at least one visual activity detection device in communication with at least one processor.

* * * * *